May 2, 1933.  A. V. DE FOREST  1,906,551
MAGNETIC TESTING METHOD AND MEANS
Filed Jan. 8, 1930  2 Sheets-Sheet 1
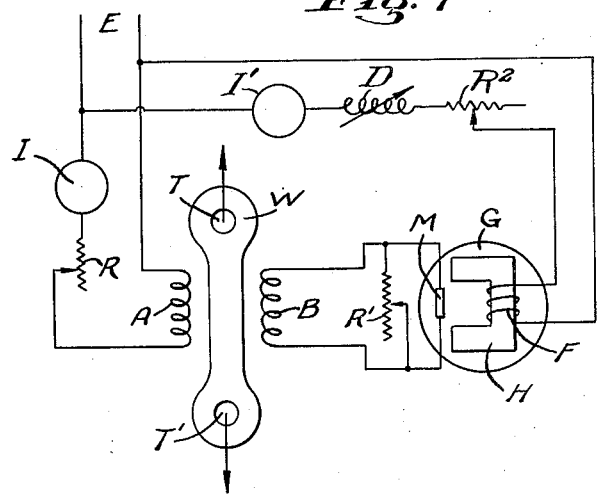
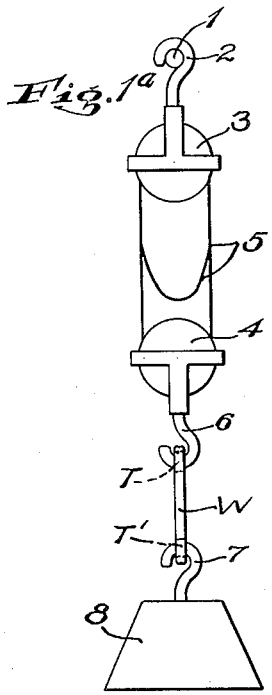
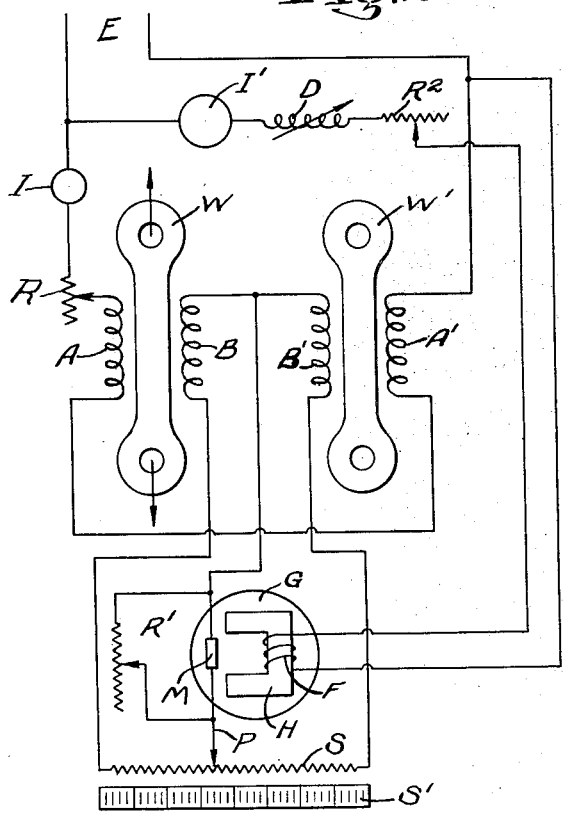
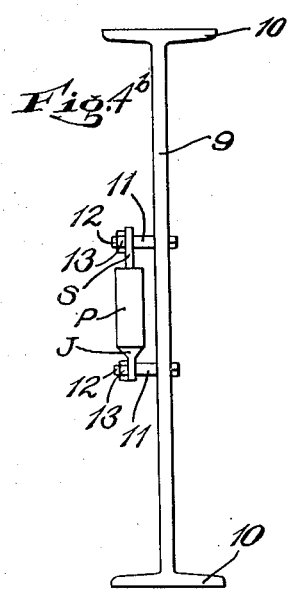
INVENTOR.
A. V. DE FOREST
BY Frederick S. Duncan
ATTORNEY May 2, 1933.  A. V. DE FOREST  1,906,551
MAGNETIC TESTING METHOD AND MEANS
Filed Jan. 8, 1930  2 Sheets-Sheet 2
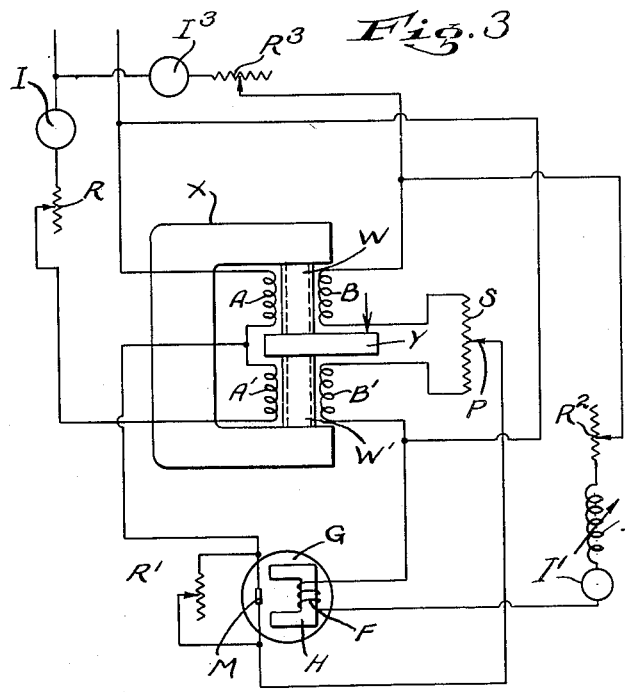
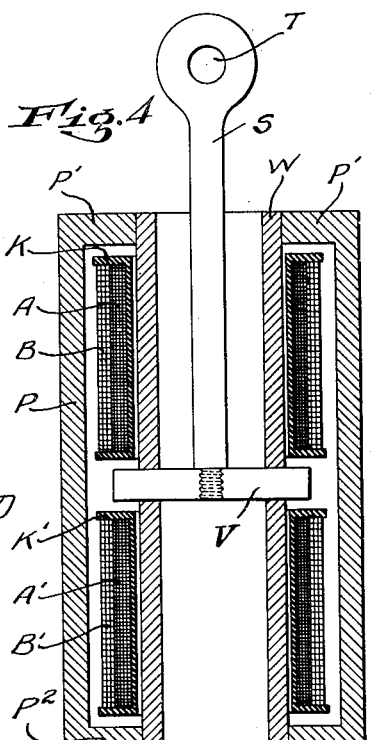
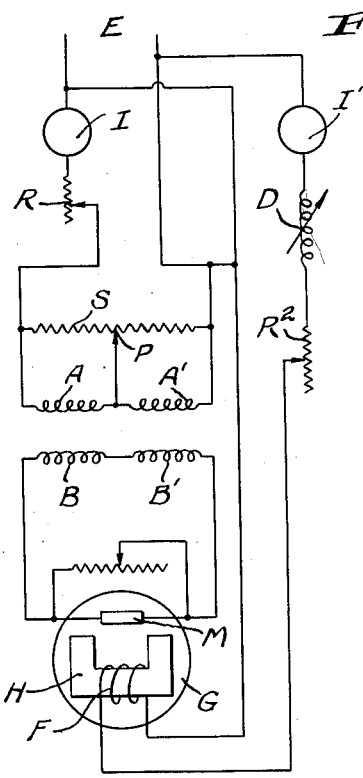
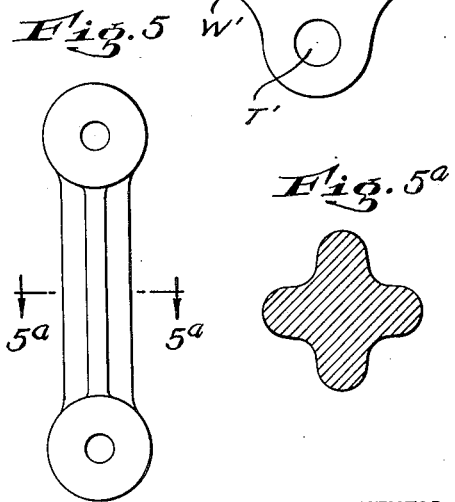
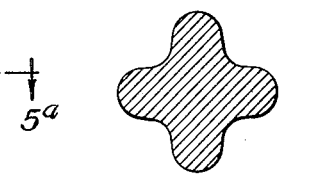
INVENTOR.
A. V. DE FOREST
BY Frederick S. Duncan
ATTORNEY Patented May 2, 1933

1,906,551

UNITED STATES PATENT OFFICE

ALFRED V. DE FOREST, OF SOUTHPORT, CONNECTICUT

MAGNETIC TESTING METHOD AND MEANS

Application filed January 8, 1930. Serial No. 419,309.

My invention relates to methods of and means for testing the magnetic and electrical properties of magnetic materials, when the latter are subjected to constant or variable external stresses, and determining the magnitude and nature of such stresses from the accompanying magnetic and electrical characteristics.

More specifically, the object of my invention is to provide a method of and apparatus for measurement of forces, by means of which weights or stresses, however applied, may be rapidly and accurately determined by magnetic means and visually noted or recorded at any distance from the object stressed.

It has long been known that the magnetic properties of a magnetized body vary with the external stresses imposed on such bodies. Practical utilization of magnetic characteristics for the direct measurement of static and variable stress has however not been very successful because of failure to select for successful measurement these particular magnetic phenomena which vary substantially in proportion to the stress acting. For example, a number of attempts have been made to utilize the change in permeability under a given magnetizing force, which is observed when a magnetic body is subjected to stress, as a means for determining the magnitude of such stress. Such a measurement has not been accepted as of value for one reason because under any given magnetizing force conditions the change in permeability does not always increase either with or proportionately to the load. To illustrate, there may be an increase in permeability for small loads and a decrease in permeability for larger loads. A still further and important difficulty is found in the part which the mechanical hysteresis characteristics play in any measurement which depends upon variations in permeability alone, in that the value of the latter under a given set of conditions depends upon whether the stress imposed upon the body is of increasing or decreasing character with reference to the immediately preceding imposed stress. That is, there is a stress hysteresis effect which is a function of the stress history of the magnetized body.

I have discovered that a combination of a permeability measurement with a core loss measurement affords decided advantages in overcoming the non-conformities mentioned. It becomes effective to a very high degree when the magnetic body to be stressed has been carefully prepared, mechanically or thermally, or both, and discrimination is used as to the value of magnetizing force employed. It so happens that the core loss characteristics vary with the imposed stresses in a quite different and to some extent compensatory manner as compared with the permeability characteristics, and that by means of a single magnetic measurement involving both of these in a combination determined by experiment, it is possible to very largely overcome the difficulties which have heretofore arisen. The test procedure thus includes a method of measurement in which observation is made of a selected component of the electro-motive force induced in a magnetized element subjected to stress, the total electromotive force being dependent upon the combined permeability and loss characteristics. The element employed for stress measurement is designated by me as a "weigh bar", and is preferably subjected to cyclically varying magnetization although other forms of varying magnetization may be used.

The various features of novelty which characterize my invention are pointed out with particularity in the claims annexed to and forming a part of this specification. For a better understanding of the invention and the advantages possessed by it, reference should be had to the accompanying drawings and descriptive matter in which I have illustrated and described various embodiments of my invention.

Fig. 1 is a diagrammatic view of an apparatus for measuring stress, in which but one stress member is employed.

Fig. 1a is a view showing the apparatus of Fig. 1 as used for measuring loads, in connection with a block hoist system.

Fig. 2 is a diagrammatic view of a similar apparatus arranged for differential measurements.

Fig. 3 is a diagrammatic view of an apparatus for measuring stress in which the differential effects of tension and compression form a basis of measurement.

Fig. 4 is a view in vertical section of a stress measuring apparatus of an enclosed type.

Fig. 4a is a diagram of the electrical connections used with the apparatus shown in Fig. 4.

Fig. 4b is a view of the apparatus of Fig. 4 as used for measurement of compression on a bridge strut member.

Fig. 5 is a side view of a form of stress member which I may employ; and

Fig. 5a is an enlarged view in section taken on the line 5a—5a of Fig. 5.

Referring to Fig. 1 there is disclosed a weigh bar member W having expanded end portions provided with openings or eyes T and T', which is inserted within a solenoid AB consisting of a primary winding A and a secondary winding B. The primary winding A is energized from a source of varying electromotive force E, through an ammeter I and a variable resistance R. The secondary or test winding B of the solenoid AB is connected to the moving coil M of a dynamometer G, which is shunted by a variable resistance R' for the purpose of controlling its sensitivity. The dynamometer G is preferably an electromagnetic moving coil instrument with a field winding F, encircling a core H, excited through the ammeter I', a phase shifter D and an adjustable resistance $R^2$. The dynamometer field core H is preferably of laminated material. The phase shifter D may be either of the capacitance or inductance type, although the inductance type as illustrated is preferred.

The weigh bar member W is disposed so as to be acted upon by a tensile stress, as indicated by the arrows. For example, it may be so placed as to constitute one element of a differential block hoist, as more fully shown in Fig. 1a. Referring to Fig. 1a, a stanchion 1 supports a hook 2 of a fixed pulley block 3 which coacts with a traveling pulley block 4, the blocks 3 and 4 being served by the chains 5. The block 4 has attached to it a hook 6 which engages with the upper eye T of the weight bar member W of Fig. 1, the other eye T' of this member engaging with a hook 7 attached to a load 8, the weight of which is to be measured. It will be obvious that the full force of the load 8 is exerted on the weigh bar member W, stressing this member in proportion to the load. Observations of such load are to be made by means of the magnetic effects of the stress on the bar W, which is of a selected grade of magnetic material and so treated as to be in as stable a condition as possible. To insure this latter, the bar is initially subjected to stress cycles of tension and compression in which it is strained above the elastic limit in each case, the overstrain then being gradually reduced. This preparation of the bar W, which may be in combination with a previous thermal treatment, is made once for all and does not require repeating unless the bar is accidentally overstrained in the course of use.

The method of adjustment and operation of the apparatus of Fig. 1 is as follows: Current is allowed to flow in the primary winding A so as to magnetize the bar W, and current is also allowed to flow in the field winding F to energize the field core H, regulation of the value of these currents being made by means of the resistance R and $R^2$ respectively. Assuming no stress on the weigh bar W, when this bar is magnetized there will be a deflection of the dynamometer moving coil by reason of the electromotive force generated in the test winding B. The amount of this deflection depends upon the degree of magnetization of the bar and the value of that component of the induced electromotive force which is in phase with the dynamometer field. The deflection is a maximum, corresponding to the permeability of the bar, when the reactance drop across the test winding B is in phase with the dynamometer field. A deflection corresponding to the core loss of the bar is obtained when that electromotive force drop which is in quadrature with the reactance drop is in phase with the field. The adjustment of the phase shifter D fixes the phase relation between the field flux of the dynamometer core H and the electromotive force acting on the moving coil M. By experiment there is determined an adjustment of the phase shifter D, so that between the limits of no load and maximum load on the bar W, for both ascending and descending values of stress, there exists a substantially linear relation between the stress and the deflection observed on the galvanometer. Coincident with this, selection of the proper value of magnetizing force is made so that proportionate changes in magnetic characteristics will accompany a stress of any one kind over as wide a range as is practicable. It is obvious that with the apparatus of Fig. 1 a zero deflection cannot be expected for zero stress, so that a false zero of the dynamometer must be used for such stress.

It may be pointed out that while the apparatus as disclosed in Fig. 1 is described as applied to tensile testing, it is equally possible to employ the same method of test in the case where the bar W is under compression, torsion, flexion, etc., or where it is subjected to cycles of stresses, as for example tension and compression. Again, while the apparatus of Fig. 1 suffices to illustrate the general principle underlying the apparatus of my invention, there are modifications which can be employed to great advantage and in Fig. 2 I illustrate a form of apparatus which permits of differential measurement. Referring to Fig. 2, a weigh bar W disposed for subjection to a tensile stress, as illustrated by the arrows, is associated with a companion bar W' having like physical characteristics to W and placed in close proximity thereto but remaining at all times unstressed. The bars W and W' are inserted respectively in the solenoids AB and A' B', the primary windings A and A' of which are connected in series with a source of variable electromotive force E through the ammeter I and variable resistance R. The secondary or test windings B and B' of the solenoids AB and A' B' are connected in series opposition to each other, the circuit embracing a non-inductive, slide wire resistance S which preferably has a scale graduated at each side from a central zero as shown at S'. A dynamometer of the externally excited electromagnetic type G having a moving coil M associated with a field core H and a field winding F, the latter being excited by current from the source E through the ammeter I', phase shifter D and variable resistance $R^2$, is so arranged that the inner terminals of the windings B and B' connect to one terminal of the moving coil M, the other terminal of which latter connects to a sliding contact P which engages with the slide wire resistance S. A variable resistance R' is disposed to allow of controlling the sensitivity of the dynamometer G.

Prior to the employment of the apparatus of Fig. 2 in the measurement of stress, it is essential to carry through a substantially similar calibrating procedure as in the case of the apparatus of Fig. 1, particularly as regards obtaining the proper phase relation adjustment between the electromotive force at the terminals of the moving coil M and the field flux of the dynamometer G. Preliminary to this, the sliding contact P of the slide wire resistance S is placed at the central zero of the scale S' and one inner terminal of the test winding B' is disconnected so that any electromotive force generated in the winding B' will not act on the dynamometer. Then current is allowed to flow through the primary winding A and A', the value of such current being controlled by means of the resistance R, and current is also allowed to flow in the field winding F, control being had by means of the resistance $R^2$. Then, as in the case of the apparatus of Fig. 1, a known series of stresses are applied to the weigh bar W and the proper magnetizing current and phase adjustments made by means of the resistance R and phase shifter D. As in the case of the apparatus of Fig. 1, zero stress on the bar W is associated with a certain degree of dynamometer moving coil deflection, since the electromotive force induced in the test winding B cannot be zero when current is allowed to flow in the magnetizing winding A. After such adjustments are made, the inner terminal of the test winding B' is reconnected and under conditions of no externally applied stress on the bars W and W' the dynamometer deflection should be zero, since there are two equal and opposite electromotive forces acting on the moving coil M. If stress is now applied to the bar W, W' remaining unstressed, there will be a deflection observed on the dynamometer which will be a measure of such stress. A series of such stresses of varying amount should give deflections, within limits, in substantially linear relation to the degree of stress.

It will be clear from the above that the apparatus of Fig. 2 allows of the use of the dynamometer under conditions where high sensitivity of measurement is obtainable, since the deflection is dependent upon the differential of the magnetic characteristics of the two bars W and W' instead of upon the characteristics of one bar as in the case of the apparatus of Fig. 1. As the composite circuit embracing the windings B and B', slide wire S and cross-connected moving coil M constitute a bridge arrangement, it is possible by so graduating the scale S' to employ this scale to indicate directly the value of any static stress acting on the bar W. Again, any resultant dynamometer deflection may be reduced to zero by movement of the sliding contact P. Such a procedure permits in turn of great increase of dynamometer working sensitivity, which is of value where precision is desired within a certain stress range.

Aside from the valuable features indicated above which accrue to the use of two weigh bars, one of which is subjected to stress while the other remains unstressed, there is a still further advantage peculiar to the differential method of measurement. Let us assume, for example, that the apparatus of Fig. 2 is to be employed in connection with a crane system where it will be subjected to varying temperature because of its proximity to a hot ingot or crucible or molten iron under conveyance. The relatively high temperatures to which the weigh bar W will then be subjected would modify its magnetic characteristics quite independently of the change in such characteristics accompanying the stress caused by the load, were it not for the fact that the companion weigh bar W' is subjected to identical temperature effects, which are rendered null due to the differential arrangement. For this reason, it is often very important to have the two weigh bars in close proximity to each other, although where temperature effects are unimportant this is usually not essential. A still further advantage of the differential arrangement as shown in Fig. 2 is that it tends to render of minor importance voltage fluctuations in the electromotive force E thereby allowing of magnetizing current supply from an ordinary commercial circuit.

As pointed out, the relation between the stress imposed upon a magnetized bar such as W and its selected magnetic characteristics employed herein as a basis of stress measurement is linear within limits only. I have found that this linear range may be extended to a considerable degree by proper mechanical treatment of the weigh bar in preparation for its use in the testing apparatus, provided that such bar is to be used for stresses of one kind only. For example, if the weigh bar is to be employed under such conditions that the stress is always one of tension, I can increase the range of the linear relationship by stressing the bar in tension to such a degree as to give it a permanent set. If it is to be used in compression only, then it is prepared by submitting it to a permanent set in compression. Again, heat treatment processes may be employed, alone or in combination with mechanical treatment, according to the nature of the material entering into the weigh bar or its special conditions of use. However, it is possible to increase the effective linear range in quite another manner and at the same time permit of the use of the one form of apparatus for both tension and compression measurements, which under some circumstances represents a distinct advantage. In Fig. 3 I show such a weigh bar system, in combination with a testing circuit differing somewhat from those previously described.

Referring to Fig. 3, a U-shaped yoke X of magnetic material has rigidly attached to its arms by means of a drive fit, a stress element WW' at the center of which is an outwardly extending platform member Y secured thereto by welding or otherwise. The stress element WW' is preferably of tubular type. Encircling the portion W of the stress element are magnetizing windings A and B and encircling the portion W' of the stress element are magnetizing windings A' and B', similar respectively to the windings A and B. The windings A and A' are connected in series as shown and energized from a source of varying electromotive force E through the ammeter I and the variable resistance R. The windings B and B' are connected in series through a slide wire resistance S with the source of electromotive force E, through an ammeter $I^3$ and variable resistance $R^3$ the combination being thus connected in shunt with the windings A and A'. The windings A and B are so disposed that their magnetizing effect on the portion W has like direction and the windings A' and B' are so disposed that their magnetizing effect on the portion W' has like direction and in the same sense as that due to the windings A and B. G is an externally excited dynamometer, the moving coil M of which is connected across the inner terminals of the primary windings A and A', the other terminal of the coil M being connected through the slide wire resistance S through the medium of a sliding contact P. H is a field core with a field winding F excited from the source E through an ammeter I', phase shifter D and adjustable resistance $R^2$. R' is a variable resistance for controlling the sensitivity of the dynamometer G. As will be clear, the four magnetizing windings A, A', B, B', are connected in a bridge arrangement in such manner that A and B, as also A' and B', form opposed members of a system which is spanned by the moving coil M.

In the operation of the apparatus of Fig. 3, the magnetizing current in the windings A and A' is adjusted by means of the resistance R and that flowing in the windings B and B' by means of the resistance $R^3$, adjustments being facilitated by means of the ammeters I and $I^3$. The current in the field winding F of the dynamometer G is adjusted by means of the resistance $R^2$, coincident with that adjustment of the phase of the dynamometer field required for observation of the selected component of the total electromotive force, as determined by experiment and heretofore explained. Under conditions where no force is exerted at the platform member Y, the moving coil M should not show a deflection from its zero position, with current in the magnetizing windings A, A', B and B', since the bridge system is intended for exact balance under such conditions. To compensate for any slight dynamometer deflection due to incidental unequal stresses on the respective stress element portions W and W' or arising from accidental and minor differences in the corresponding respective magnetizing windings, the position of the contact slider P may be shifted so as to bring about an exact balance. Then, when a stress is applied to the member Y an electromotive force will be set up due to the oppositely directed magnetic changes produced on the element portions W and W', resulting in a dynamometer deflection which accordingly becomes a measure of such stress. Since the force acting at Y may be either one of tension or compression, it follows that the apparatus of Fig. 3 is of value in the obtaining of information regarding the nature and degree of the variable stresses acting upon a structural member under live loads. To employ the apparatus accordingly, it is merely necessary to affix the member Y to some portion of the structural element upon which the stress is acting, the yoke X being rigidly anchored to some foundation structure. This weigh bar arrangement of Fig. 3 may also be considered in the light of its use as one of a plurality of stress elements employed as a weight measuring device of the platform scale type, the load on each element being applied at Y. A platform scale constructed in this manner offers advantages over the more commonly used lever scale because of the possibility of eliminating knife edge supports, avoidance of inertia of moving parts and because equalizing rods, for the purpose of distributing the load uniformly, are rendered unnecessary.

In Fig. 4 I show a weigh bar element which offers some advantages over those previously described, particularly as to compactness and general utility. Referring to Fig. 4, which is a drawing in sectional elevation, weigh bar members W and W' of tubular form are joined together, preferably by welding, to a central member V of disk form. Attached to the disk V at its center, through the medium of a screw thread, as shown, is a stud bolt S which passes interiorly of the weigh bar member W and terminates in an eye T. A casing P of magnetic material of tubular form having flanges P¹ and P², which are welded or otherwise rigidly secured to the outer extreme regions of the tubular members W and W', has attached to it a head J which terminates in an eye T'. Winding forms K and K', of insulating material, are concentrically disposed, as shown, about the weigh bar members W and W'. The form K supports primary and secondary windings A and B and form K' primary and secondary windings A' and B', the primary and secondary windings being respectively alike to each other. The primary windings A and A' are connected in series with a source of variable electromotive force E through the ammeter I and variable resistance R, as shown schematically in Fig. 4a. In shunt with the windings A and A' is a slide wire resistance S engaging with which is a sliding contact P connected to the inner terminals of the windings A and A'. The secondary windings B and B' are connected in series through the moving coil M of a dynamometer G of the separately excited electromagnetic type, which has a field element composed of a field core H and a field winding F, the latter being excited from the source E through the ammeter I', phase shifter D and variable resistance R². A variable resistance R' is disposed in shunt with the coil M to allow of controlling the sensitivity of the dynamometer G. The connections of the primary or magnetizing windings A and A' are so made that the magnetic flux induced respectively in the members W and W' has the same direction, the magnetic circuit being closed through the casing P. The connections of the secondary or test windings B anl B' are so made that the electromotive forces induced therein are in series opposition to each other.

The weigh bar element of Fig. 4 may be disposed so as to be acted upon by a stress either of tension or compression. For example, it may be so used as to indicate the compressive stress exerted upon a structural member such as a supporting column, under varying conditions of load. In Fig. 4b I show in end elevation an I-beam comprising one portion of a bridge strut member which has a web 9 and flanges 10. For the purpose of measuring the compressive stress, posts 11, rigidly attached to the web 9 by means of bolting, have ends 12 which pass through the terminals T and T' of the weigh bar member of Fig. 4 and are secured thereto by means of nuts 13. It will be clear that when a compression stress is exerted between the flanges 10 of the I-beam as indicated by the arrows, the eyes T and T' move relatively toward each other, subjecting the members W and W' of the weigh bar to forces of tension and compression respectively. In the operation of the apparatus of Fig. 4, the magnetizing current in the windings A and A' is adjusted by means of the resistance R and the current in the field winding F of the dynamometer G is adjusted by means of the resistance R², coincident with that adjustment of the phase of the dynamometer field required for observation of the selected component of the differential electromotive force to be measured, as determined by experiment and previously explained. Under conditions where no force is exerted between the eyes T and T', the movable coil M should not show a deflection from its zero position except such as might be due to slight unequal stresses on the elements W and W' or arising from minor differences in position or form of their respective magnetizing and test windings. In the event of a moving coil deflection this may be adjusted to zero by a shift of the contact P. When stress is applied between the eyes T and T' an electromotive force will be set up due to the oppositely directed magnetic changes produced on the members W and W', resulting in an dynamometer deflection which accordingly becomes a measure of such stress. The use of the slide wire resistance S and adjustable contact P also affords a means of compensating for any slight initial stress of tension and compression which may be exerted on the members W and W', by reducing the corresponding dynamometer deflection to zero and thereby allowing for the full use of the dynamometer scale in that region of stress which it is desired to observe with particularity.

As I prefer to employ alternating current at commercial frequencies for the purpose of magnetizing the weigh bars which enter into the apparatus constructed according to my invention, I find it advisable to shape these bars, as to their section, so that the magnetization shall be as uniform as possible and the shielding effects of eddy currents minimized. This may be accomplished by so disposing the material in the weigh bars that the required strength and stiffness will be sufficient to withstand the imposed stress and yet the resistance to eddy currents may be high. For example, in Figs. 3 and 4 the weigh bars shown are of tubular form to meet these conditions but the bars of Figs. 1 and 2 may equally well be of hollow tube form. A wide variety of shapes offer themselves for this purpose and in Figs. 5 and 5a I show one of these which offers special advantages. Referring to Fig. 5a, the section shown is of cross or star shape wherein the metal in the region near the outer surface forms a very large part of the whole section, the material being thus disposed so as to effectively minimize eddy currents.

When stresses of any kind other than those so far described are applied to magnetizable bodies there are accompanying changes in magnetic characteristics which may be employed as bases of measurement of such stress and the principle underlying my invention is entirely applicable. For example without essential change the apparatus of Fig. 4 may be employed in the measurement of torsion. That is, if a force is applied so as to produce a relative turning movement as regards the eyes T and T' the torsional stress set up in the members W and W' will be measurable by means of the dynamometer G. Where stresses of any kind are to be measured and are of such magnitude that it is impracticable to employ any one weigh bar element, it is entirely feasible to use a number of such elements in multiple. For example, groups of weigh bar elements such as W in Fig. 1 or W and W' of Fig. 3 may be employed in connection with the measurement of cars in motion, i. e., in a track scale structure. In such cases the magnetizing and secondary windings of the respective elements, or groups of elements, may be connected in series so as to give an additive effect.

While changes in magnetic properties have been in use for some time as a means for measuring stress, in all cases the proposals have called for the measurement of the change in magnetic induction or magnetic linkage brought about under the influence of such stresses and therefore differ strictly from the method and means disclosed herein. While the measurement of change in magnetic induction enters in part into my invention, the feature which differentiates it and renders it operative to a high degree of accuracy consists in a method of measurement which invokes not only induction characteristics but also the core loss characteristics, in such a combination as experience shows is indicative of the avoidance of stress hysteresis and other effects which have caused loss of proportionality.

While I have shown and described certain embodiments of my invention, it will be apparent to those skilled in the art that changes may be made in the mode of operation and forms of apparatus disclosed without departing from the spirit of my invention, and that certain features of the invention may sometimes be used without a corresponding use of other features.

I claim:

1. The method of measuring a force which consists in applying such force to a magnetizable body as to place it under stress, subjecting said body to a uniformly varying magnetic field and measuring a component of the electromotive force induced in a test coil linking with said body, the value of such component being dependent upon the value of such stress.

2. The method of measuring a force which consists in applying such force to a magnetizable body as to place it under stress, subjecting said body to a uniformly varying magnetic field and measuring a component of the electromotive force induced in a test coil surrounding said body, the value of said component being dependent upon the value of said stress.

3. The method of measuring a force which consists in placing a magnetizable body in a uniformly varying magnetic field, applying such force to said body as to place it under stress, and measuring a combination of its permeability and loss characteristics free from hysteresis effect while subjected to such stress.

4. The method of measuring a force which consists in placing a magnetizable body in a uniformly varying magnetic field, applying such force to said body as to place it under stress, and obtaining a measure of that component of the electromotive force induced in a winding encircling the body which is insensitive to mechanical hysteresis, and which is a predetermined function of said stress.

5. The method of measuring a force which consists in placing a magnetizable body in a uniformly varying magnetic field, applying such force to said body subjected to the effects of a magnetomotive force as to place the body under stress, and measuring that combination of the permeability and loss characteristics of said body, which is a known function of said stress.

6. The method of measuring a force which consists in applying such force to a plurality of bodies individually subjected to the effects of uniformly varying magnetomotive forces as to place such bodies under stress, and measuring that combination of the permeability and loss characteristics of said bodies, which varies approximately linearly with said stress.

7. In combination, a magnetizable body, means for stressing said body, means for setting up a uniformly varying magnetic field about said body, a test coil inductively associated with said body and means for measuring a component of the electromotive force induced in said coil when the said body is variably magnetized by said field.

8. In combination, a magnetizable body, means for stressing said body, means for setting up a uniformly varying magnetic field about said body, a second magnetizable body not subjected to stress, means for variably magnetizing said second body, test coils inductively associated with said bodies and means for measuring the differential of the electromotive force components induced in said coils when the said bodies are variably magnetized by said field.

9. In combination, a magnetizable body, means for setting up a uniformly varying magnetic field about said body, means for stressing said body, a test coil inductively associated with said body and means for comparing a component of the electromotive force induced in said body with an electromotive force proportional to a known stress when the said bodies are variably magnetized by said field.

10. In a device of the class described, in combination, means for applying a stress, a magnetizable body subjected to said stress, means for setting up a uniformly varying magnetic field about said body, a test coil inductively associated with said body and means for measuring a component of the electromotive force induced in said body when the said body is magnetized by said field.

11. The method of measuring a force which consists in subjecting a magnetizable body to stress cycles of tension and compression to strain the body above its elastic limit and gradually reducing said strain, thereafter subjecting the body to a uniformly varying magnetic field, applying to the body the force to be measured so as to place the body under stress, and measuring a component of the electro-motive force induced in a test coil surrounding the body while under the latter stress, such component being one in which there is no hysteresis between loading and unloading.

12. The method of measuring a force which consists in placing a magnetizable body in a uniformly varying magnetic field, applying such force to said body so as place it under stress, selecting a component of electro-motive force induced in a test coil surrounding said body in which there is no hysteresis between loading and unloading, and measuring said component.

In testimony whereof, I have signed this specification.

ALFRED V. DE FOREST.